US012725139B1

(12) United States Patent
Telem

(10) Patent No.: US 12,725,139 B1
(45) Date of Patent: Sep. 1, 2026

(54) INTERACTIVE AI FORTUNE-TELLING KIOSK SYSTEM AND METHOD

(71) Applicant: Boaz Telem, Netanya (IL)

(72) Inventor: Boaz Telem, Netanya (IL)

(73) Assignee: Foto Master LTD, Rehovot (IL)

(*) Notice: Subject to any disclaimer, the term of this patent is extended or adjusted under 35 U.S.C. 154(b) by 0 days.

(21) Appl. No.: 19/398,140

(22) Filed: Nov. 24, 2025

(51) Int. Cl.
*G06Q 20/18* (2012.01)

(52) U.S. Cl.
CPC .................................... *G06Q 20/18* (2013.01)

(58) Field of Classification Search
CPC ......... G06Q 20/18; G06Q 50/12; G06Q 20/20
See application file for complete search history.

(56) References Cited

U.S. PATENT DOCUMENTS 1,539,223 A 5/1925 Waterstraat
5,479,529 A 12/1995 Nakagawa et al.
5,636,839 A 6/1997 Oda
9,764,225 B1 * 9/2017 Munari .................. A63F 9/181
11,170,286 B2 11/2021 Dolignon et al.
2005/0025364 A1 * 2/2005 Kim .................. G06V 40/1347 382/190
2021/0097883 A1 * 4/2021 Scott ...................... G09B 19/00
2024/0087300 A1 * 3/2024 Lindvall ............ G06V 10/7715

OTHER PUBLICATIONS

Evan Holbert, "Coin-Op AI Fortune Teller," Hackster.io (2023). https://www.hackster.io/mellowyell/the-oracle-coin-op-ai-fortune-teller-972862.

* cited by examiner

*Primary Examiner* — Ariel J Yu
*Assistant Examiner* — Denisse Y Ortiz Roman
(74) *Attorney, Agent, or Firm* — Haim Factor—1st-Tech-Ideas.com

(57) ABSTRACT

An interactive AI fortune-telling kiosk system configured to interact with a user, the kiosk system comprising: an input subsystem having a kiosk structure, the input subsystem including: a touch screen; a camera; a proximity sensor; a scanner; and a payment interface; a processing subsystem including: a main processor; a secondary processor; and a kiosk software; an output subsystem including: a display controller; a display; a user output device; and a speaker/audio device; wherein the processing subsystem is configured to receive inputs from the input subsystem, to control a session flow; and to manage hardware components; and wherein the kiosk software is configured to provide palmistry interpretation; portrait transformations; and to orchestrate a session.

14 Claims, 7 Drawing Sheets

INTERACTIVE AI FORTUNE-TELLING KIOSK SYSTEM AND METHOD

FIELD OF INVENTION and BACKGROUND

Embodiments of the current invention relate to the field of fortune-telling devices and machines and specifically to an interactive AI fortune-telling kiosk system and method.

In the specification and claims which follow, unless otherwise indicated, the term "user" is intended to mean a person who is interacting with a fortune telling kiosk system. Additionally, in the specification and claims which follow, the terms "kiosk" and "kiosk structure" are used interchangeably and are intended to mean a structure typically configured in a building, within an enclosed space, or in a public place and serving to interact with a user, as known in the art. In the specification and claims which follow, the term "session" is intended to mean a period of time, usually a number of minutes, in which a user interacts with the kiosk, typically to obtain a personalized fortune-telling experiences, as described hereinbelow.

Automated fortune-telling machines have existed since the early 20th century. Early coin-operated machines, such as the classic "Zoltar" arcade figures, dispensed pre-written fortunes on cards. These systems were mechanical or electro-mechanical, offering fixed, non-personalized outputs.

In 1925, Waterstraat, in U.S. Pat. No. 1,539,223, described a device adapted to be used by amateurs in palmistry to easily and quickly disclose the significance or meaning of lines or impressions upon the palm of the hand.

Later electronic arcade machines incorporated basic palm-reading gimmicks, where a user placed a hand on a light sensor and received a printed ticket with a generic horoscope.

In the 1990s, patents emerged for biometric fortune-telling systems. For example, Masamichi Nakagawa in U.S. Pat. No. 5,479,529, describes a character and fortune telling apparatus for hobby use comprising an input unit for generating a two-dimensional image based on a person's face, a feature extraction unit for extracting the coordinates and distances expressing the shapes and positions of the features of the face, from the two-dimensional image, and an output unit for producing personal information about a person from the extracted features, and for outputting the information on an appropriate output device.

In U.S. Pat. No. 5,636,839, Oda and Takashi describe an interactive control unit for determining inquiries to each of participants by images on the basis of inputted personal information of each of the participants, determining a next inquiry to each of the participants on the basis of a response of each of the participants inputted from an input unit and repeating inquiry/response relating to the attraction by an interactive method is provided for a host computer. A sensor for detecting whether or not a portable device placed in a receiving portion is touched is provided for the input unit so that input of a response from each participant is performed by touching/releasing the hand from the portable device. Further, portable devices each including ID each of which is carried by the participant of the attraction and terminal units each having an ID reading function for reading the ID of the portable devices each including ID placed in receiving portions are provided, wherein control systems of the attraction system discriminate the participants on the basis of the ID read by the terminal units and discriminate the positions of the participants on the basis of the ID and identifier of the terminal unit. Still further, personal information of each participant inputted from an input terminal unit is totaled, and a specific person is selected from the participants that meets predetermined conditions of the theme of the attraction on the basis of the totaled information. An illumination command is transmitted to the terminal unit of the selected specific person to irradiate the portable device with light by a light emitting unit of the terminal unit so as to cause the inner surface of the portable device to emit light.

Such prior art systems relied on pre-programmed algorithms and/or lacked true computation or personalization. More recently, interactive avatar kiosks have appeared, such as concierge holographic assistants or celebrity fortune-teller booths using pre-recorded video information. These kiosks are limited to scripted content.

Palmistry apps and photo transformation apps on mobile phones are also known in the art, providing palm readings or aging effects using AI. However, such apps lack a kiosk form factor, holographic presentation, physical souvenir printing, and pay-per-play monetization.

Additional prior art further include:

U.S. Pat. No. 9,764,225, where Munari describes an electronic, automated fortune telling device utilizing celebrity personalities to entertain users. A portable standalone unit includes a cabinet housing a video display, bill validator, debit/credit card reader, user interface, processor, memory and speakers. The memory maintains one or more databases of celebrity video and audio files which are used to present the fortune telling routines to the user via the video display. A user is able to select a celebrity to present the fortune telling routine. The fortune telling device may also be configured to perform mock celebrity weddings after which the fortune telling device prints a wedding certificate and/or dispenses a pair of wedding bands and/or transmits a digital wedding photo.

Dolignon et al., in U.S. Pat. No. 11,170,286, describe methods for providing an enhanced encounter via a holographic virtual assistant, including detecting, by one or more processors, an encounter request from a user, selecting a first encounter including a first holographic representation and a first dialog output, providing the first encounter for presentation to the user on the holographic virtual assistant, receiving, from the user, a first user reaction, the first user reaction including a first user dialog input and a first user engagement input, and training, using the first user reaction, a conversational goal model.

In an article by Evan Holbert, entitled "Coin-Op AI Fortune Teller," Hackster.io (2023), a system is described wherein the user, after submitting their offering, is prompted by the LCD to enter their birthdate on the keypad. The code looks up their zodiac sign and passes it to another program that does the chatGPT call to request a horoscope in the literary style of HP Lovecraft/Dr. Seuss. The resulting string is converted to a bitmap, then an existing image is appended to it. The Game Boy, running a custom ROM, is controlled by opto-isolator ICs (PC817, DIP-4) that "press" the buttons and give the illusion the Game Boy is doing the divination. Finally, another program is run to connect to the printer and prints the .bmp file with the user's horoscope.

Shortcomings of the prior art include, but are not limited to:

- Classic fortune machines: mechanical or electro-mechanical systems offering fixed and/or non-personalized outputs;
- AI photo apps: not having a kiosk form factor, no hologram avatar; and no palmistry nor pay-per-play model; and Digital assistants/holograms: not having integration with palm reading, photo capture, or fortune-telling narratives.

There is therefore a need for a system and method which address shortcomings of the prior art noted hereinabove, specifically including: unique integration of input sensors, AI analysis, holographic avatar, and event-focused pay-per-play deployment.

SUMMARY OF THE INVENTION

According to one aspect of the present invention, there is provided an interactive AI fortune-telling kiosk system configured to interact with a user, the kiosk system comprising: an input subsystem having a kiosk structure, the input subsystem including: a touch screen; a camera; a proximity sensor; a scanner; and a payment interface; a processing subsystem including: a main processor; a secondary processor; and a kiosk software; an output subsystem including: a display controller; a display; a user output device; and a speaker/audio device; wherein the processing subsystem is configured to receive inputs from the input subsystem, to control a session flow; and to manage hardware components; and wherein the kiosk software is configured to provide palmistry interpretation; portrait transformations; and to orchestrate a session. Preferably, a cloud/network is configured to communicate with the processing subsystem, the cloud/network including a network interface configured to provide connectivity for cloud-based AI services, updates, and remote monitoring, and a cloud/services module configured to host Large Language Models (LLMs), AI image models, content libraries, and analytics. Most preferably, the network interface is further configured to support Wi-Fi, ethernet, and cellular communication. Typically, the cloud/network is configured wholly remotely to the interactive AI fortune-telling kiosk system. Most typically, the cloud/network is configured partially remotely to the interactive AI fortune-telling kiosk system. Preferably, the cloud/network is configured to ensure scalability, to enable real-time and batch processing, and to provide data used by the output. Most preferably, the touch screen of the input subsystem is configured to serve as a main user interface with the kiosk system; wherein the camera is configured to capture user portraits for AI-based image transformations; and wherein the scanner is configured to scan a hand of the user being placed thereupon, for palmistry analysis. Typically, the display of the output subsystem is configured to display an animated fortune teller avatar and user outputs; and wherein the speaker/audio device is configured to convey speech and music to the user.

According to another aspect of the present invention, there is further provided a method of operating an interactive AI fortune-telling kiosk system, the system including: an input subsystem including: a touch screen; a camera; a proximity sensor; a scanner; and a payment interface; a processing subsystem including: a main processor; a secondary processor; and a kiosk software; an output subsystem including: a display controller; a display; a user output device; and a speaker/audio device; whereby the interactive AI fortune-telling kiosk system is operated in a session with a user to receive an interactive AI fortune-telling experience, the method comprising: validation of payment by a payment interface, which gates the kiosk between pay-per-use and free play without payment in event/rental use; displaying an animated fortune teller avatar on the display, whereby the avatar greets the user with audio/visual animation; capturing a portrait image of the user for subsequent AI-driven image transformations, including aging effects; lifestyle transformations; and an overlay with palmistry results; activating the scanner, following detection of the user placing his hand in a correct position in the scanner, to capture at least one palm image of a hand scan; completing the hand scan, whereby the avatar acknowledges scan completion to the user, and the at least one palm image is stored for further analysis; applying artificial intelligence models to the at least one palm image and the portrait image to perform palmistry analysis and photo processing; displaying the avatar with a personalized response, the avatar greeting the user and delivering a personal message; and generating at least one composite output artifact which is displayed to the user before saving, printing, and deleting. Preferably, displaying an animated fortune teller avatar includes animations and text on the display and speech output via the speaker/audio device. Most preferably, completing the hand scan includes the avatar instructing the user to remove his hand.

Typically, palmistry analysis includes extraction of hand features and feeding structured prompts into a language model to generate a fortune narrative. Most typically, the at least one composite output artifact includes the portrait image and an AI-enhanced photo transformation, the AI-enhanced photo transformation representing the user in the future, with an overlaid fortune text. Preferably, generating at least one composite output artifact further includes showing an output control on the display, the output control serving to allow output of the at least one composite output artifact including: a printout; a digital delivery including email, SMS, and QR code; and an online gallery.

LIST OF DRAWINGS

The invention is described herein, by way of example only, with reference to the accompanying drawings, wherein.

DETAILED DESCRIPTION

Embodiments of the current invention relate to the field of fortune-telling devices and machines and specifically to an interactive AI fortune-telling kiosk system and method. Among other configurations, the fortune telling kiosk system can take a form of pay-per-play entertainment attraction. Embodiments of the current invention include the AI fortune-telling kiosk system having multiple input sensors, artificial intelligence processing, and holographic avatar presentation to deliver personalized fortune-telling experiences to a user.

Embodiments of the current invention include a system having a touch screen, a palm scanner, a camera, a proximity sensor, and a payment interface—all being controlled by at least one processor. The at least one processor executes software that orchestrates palm reading, portrait transformations, and narrative generation using AI models-all as described hereinbelow.

Additionally, embodiments of the current invention include an animated or holographic avatar presenting outputs, a greeting, and compliments to the user. A composite artifact, such as a photo with palmistry text overlay, is generated and delivered to the user by printing, email, SMS, and/or QR code.

Figure 1:
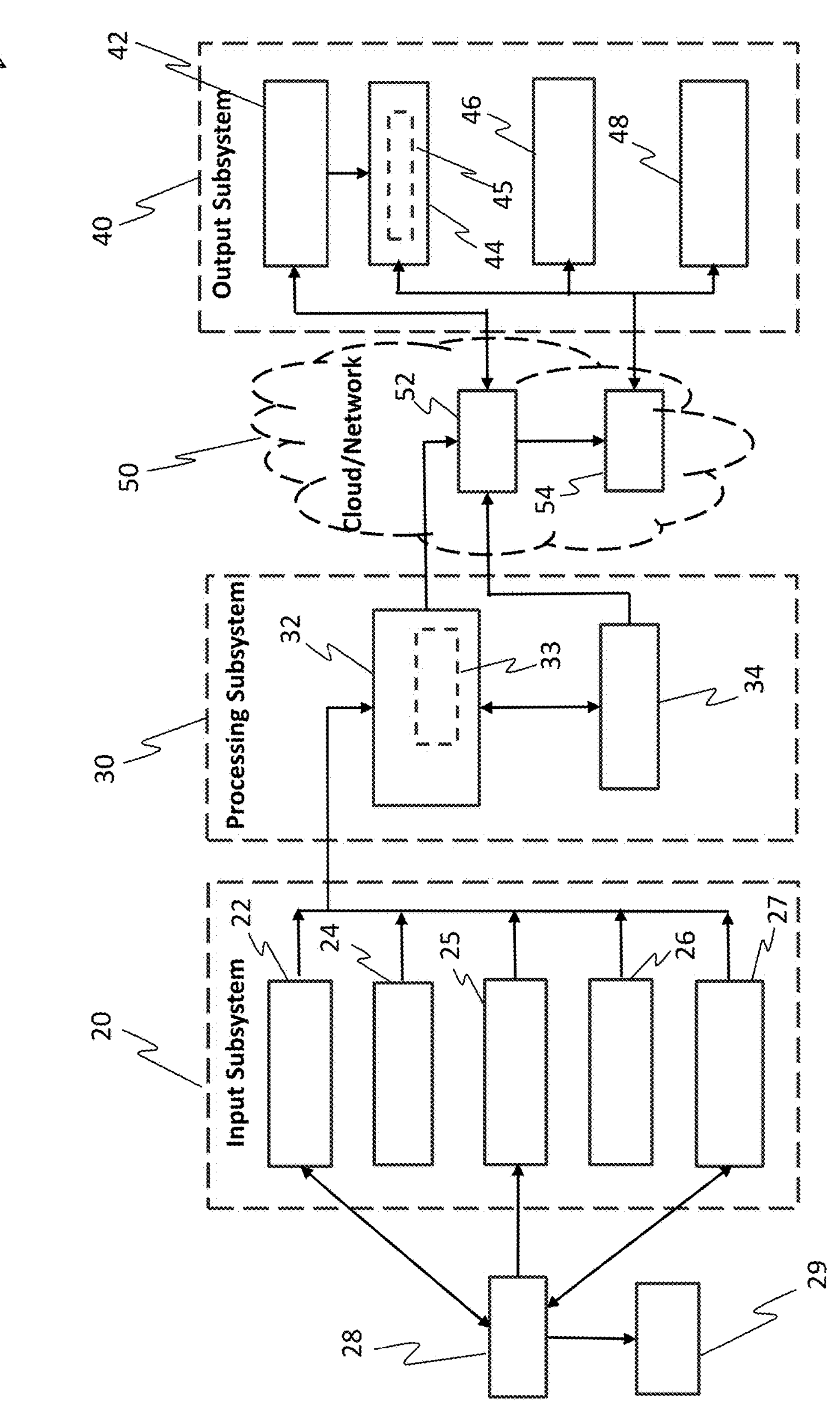
FIG. 1 is overview flowchart/block diagram of an interactive AI fortune-telling kiosk system, in accordance with embodiments of the current invention.

Reference is currently made to FIG. 1, which is an overview flowchart/block diagram of an interactive AI fortune-telling kiosk system 10, in accordance with embodiments of the current invention. The AI fortune-telling kiosk system has three major subsystems, namely: an Input Subsystem 20; a Processing Subsystem 30; and an Output Subsystem 40. Input Subsystem 20 includes: a touch screen 22; a camera 24; a proximity sensor 25; a payment interface 26; and a scanner 27—all typically housed within a kiosk-type structure, as further described hereinbelow.

Touch screen 22 serves to initiate interactive sessions with the kiosk system, as described hereinbelow, and additionally serves as a main user interface with the kiosk system. Variants of the touch screen include capacitive, resistive, and projected capacitive screens. Camera 24 serves to capture user portraits for AI-based transformations described hereinbelow. Modes of camera 24 include, but are not limited to: RGB, depth sensing, and infrared.

Proximity sensor 25 serves to detect an approach of a user, with his hand being placed on scanner 27. Variants of the proximity sensor include: ultrasonic; infrared; capacitance; and optical-based sensors. Payment interface 26 is configured to accept multiple payment methods, including coins, bills, credit/debit cards, NFC, and mobile wallet payments. Scanner 27, used to scan the user's hand being placed thereupon, is an optical and IR-based device for palm imaging. Alternative configurations of the scanner include: a flatbed biometric scanner; handheld sensors, and integrated camera-based palm recognition.

A user 28 interacts/interfaces with touch screen 22, proximity sensor 25, and with scanner 27 as described hereinabove. A print-ready access panel 29, typically configured in a front-facing access slot of the kiosk structure, is configured to dispense printed outputs for user collection. The term "hardware components", used hereinbelow, is intended to collectively mean the elements included in input subsystem 20, inter alia.

Processing Subsystem 30 includes: a Main Processor 32 and a Secondary Processor 34. Main Processor 32 includes, inter alia, a kiosk software 33 and is in communication with Secondary Processor 34. Main Processor 32 serves to execute kiosk software 33, to control a session flow (as described hereinbelow), and to manage hardware components, including receiving inputs from the input subsystem. Additionally, kiosk software 33 serves to provide:

- Palmistry interpretation: to extract palm landmarks, feed features into language models, and to generate narrative outputs;
- Portrait transformations: to apply AI models for aging, wealth, and stylistic modifications; and
- Session orchestration: to manage inputs, avatar responses, timing, and outputs.

Main Processor 32 may be one or more CPUs, embedded systems, and SoC devices. Secondary Processor 34 serves to support real-time AI transformations, reducing latency and the Secondary Processor may be an optional GPU and TPU.

Output Subsystem 40 includes: a display controller 42; and a display 44, which serves to display an animated fortune teller avatar 45 and user outputs, such as, but not limited to a text overlay on the touch screen. Output Subsystem 40 includes further includes a print output device 46; and a speaker/audio device 48.

Display controller 42 may use LCD/LED, Pepper's Ghost, and volumetric projection technologies. Display 44 may include a 2D display, a stereoscopic display, and a holographic display. Print output device 46 serves to provide a physical memento and may include thermal, inkjet, and dye-sublimation printers. Speaker/audio device 48 may include mono, stereo, and surround audio to convey speech and/or music to the user.

As seen in the referenced figure, a cloud/network 50 may be an integral part of interactive AI fortune-telling kiosk system 10. Alternatively or optionally, cloud/network 50 may be configured wholly or partially remotely to interactive AI fortune-telling kiosk system 10, communicates with Processing Subsystem 30 and may provide data used by Output Subsystem 40. Cloud/network 50 includes: a network interface 52 and a cloud/services module 54. Network interface 52 acts to provide connectivity for cloud-based AI services, updates, and remote monitoring, and it supports Wi-Fi, Ethernet, and cellular (SIM card and eSIM). Cloud/services module 54 serves to host LLMs, AI image models, content libraries, and analytics. A configuration of the cloud/services module ensures scalability and enables real-time and batch processing.

Figure 2:
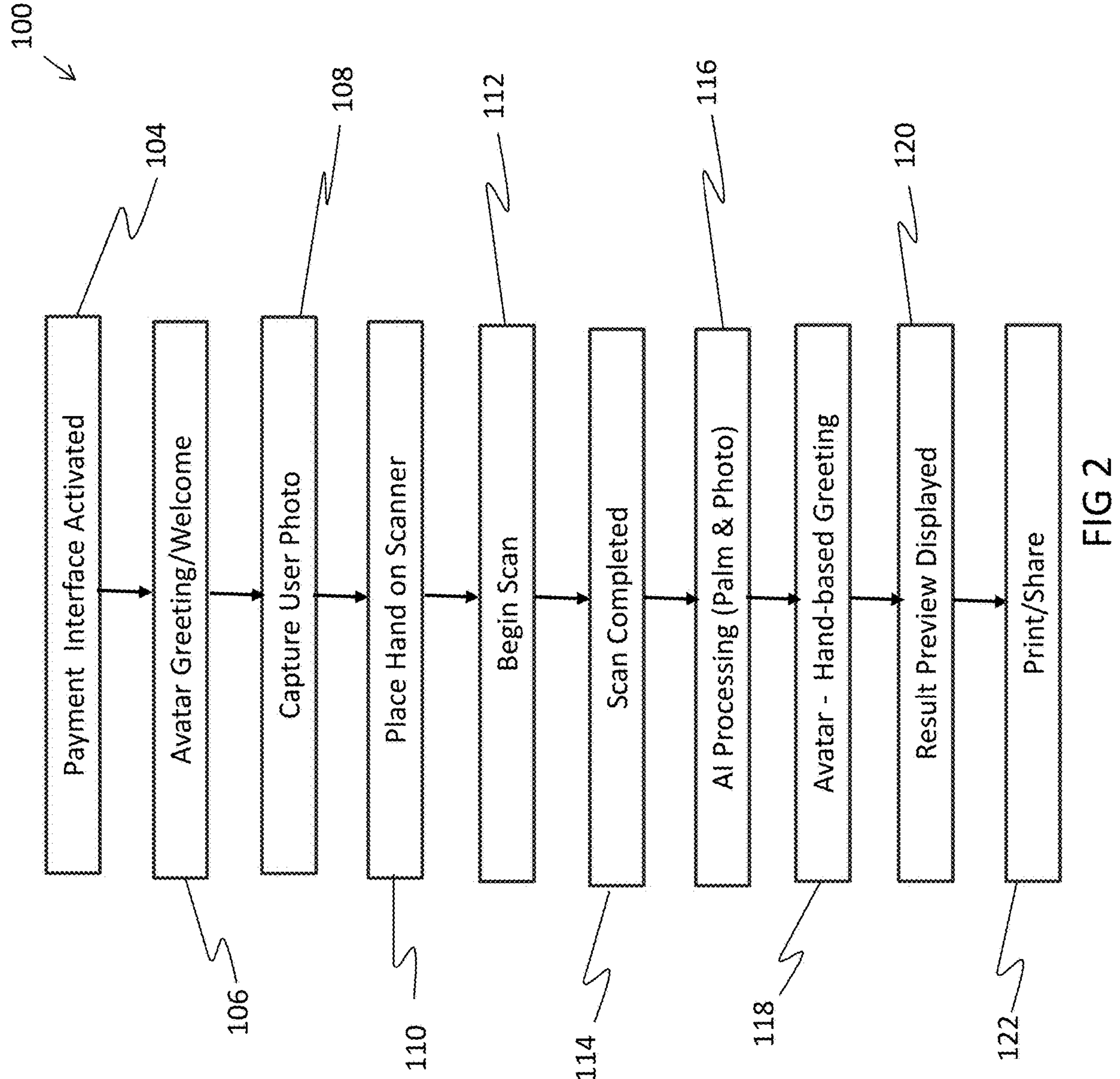
FIG. 2 is a flowchart of a method of operating the interactive AI fortune-telling kiosk system of FIG. 1, in accordance with embodiments of the current invention.

Reference is currently made to FIG. 2, which is a flowchart of a method 100 of operating the interactive AI fortune-telling kiosk system of FIG. 1, in accordance with embodiments of the current invention. The method described herein is that of a "session", namely immediately after user approaches the kiosk to receive an interactive AI fortune-telling experience. Additionally, the method description hereinbelow refers to elements of interactive AI fortune-telling kiosk system 10 shown in FIG. 1.

The session begins with step 104, Payment Interface Activated. Payment interface 26 of FIG. 1 validates a correct/acceptable transaction. (Payment methods may include coins, bills, credit/debit cards, NFC contactless readers, and cloud-based credits.) Payment validation may gate the kiosk between pay-per-use; or in event/rental use, free play may be allowed without payment.

Then, in step 106, Avatar Greeting/Welcome, animated fortune teller avatar 45 (of FIG. 1) is displayed on display 44 (of FIG. 1) and controlled by the at least one processor and greets the user with an audio/visual animation. A greeting may include animations and text on the display and speech output via speaker/audio device 48 (of FIG. 1).

In step 108, Capture User Photo, camera 24 (of FIG. 1) captures a portrait image of the user for subsequent AI-driven image transformations. The portrait ("captured image") may be stored for later processing or sent immediately for processing such as, but not limited to aging effects, lifestyle transformations, or overlay with palmistry results. In step 110, Place Hand on Scanner, following a request by the avatar, the user places his hand on/within scanner 27 (of FIG. 1).

In step 112, Begin Scan, proximity sensor 25 (of FIG. 1) detects the user's hand being placed in the correct position and scanner 27 is activated to capture one or more palm images. In step 114, Scan Complete, main processor 32 (of FIG. 1) serves to confirm successful palm image capture.

The avatar acknowledges scan completion, optionally or alternatively instructing the user to remove his hand. The one or more scanned palm images are stored for further analysis.

In step 116, AI Processing (Palm & Photo), main processor 32 and/or cloud/services module 54 (both of FIG. 1) serve to apply artificial intelligence models, to perform:

- Palmistry analysis: extract hand features and feed structured prompts into a language model to generate a fortune narrative.
- Photo processing: apply AI image transformations (e.g., aging, lifestyle simulation, stylistic modifications).
- Hybrid implementations may use local preprocessing with final results generated in the cloud.

In step 118, Avatar—Hand-based Greeting, the avatar is displayed and outputs a personalized response, greeting the user and delivering a personal message including, but not limited to: a fortune narrative and a compliment.

The personal message may include synchronized speech, facial animations, and text overlay on the touch screen. In step 120, Result Preview Displayed, a composite output artifact is generated, which may include a user photograph and a palmistry narrative text—as described further hereinbelow. The user may view the composite output artifact before saving, printing, or deleting.

In step 122, Print/Share, an output control, shown on the display, serves to allow output of one or more output artifacts delivered in one or more ways, including: a printout: a digital delivery (including email, SMS, and QR code); and an online gallery (an optional cloud-based repository).

Figure 3:
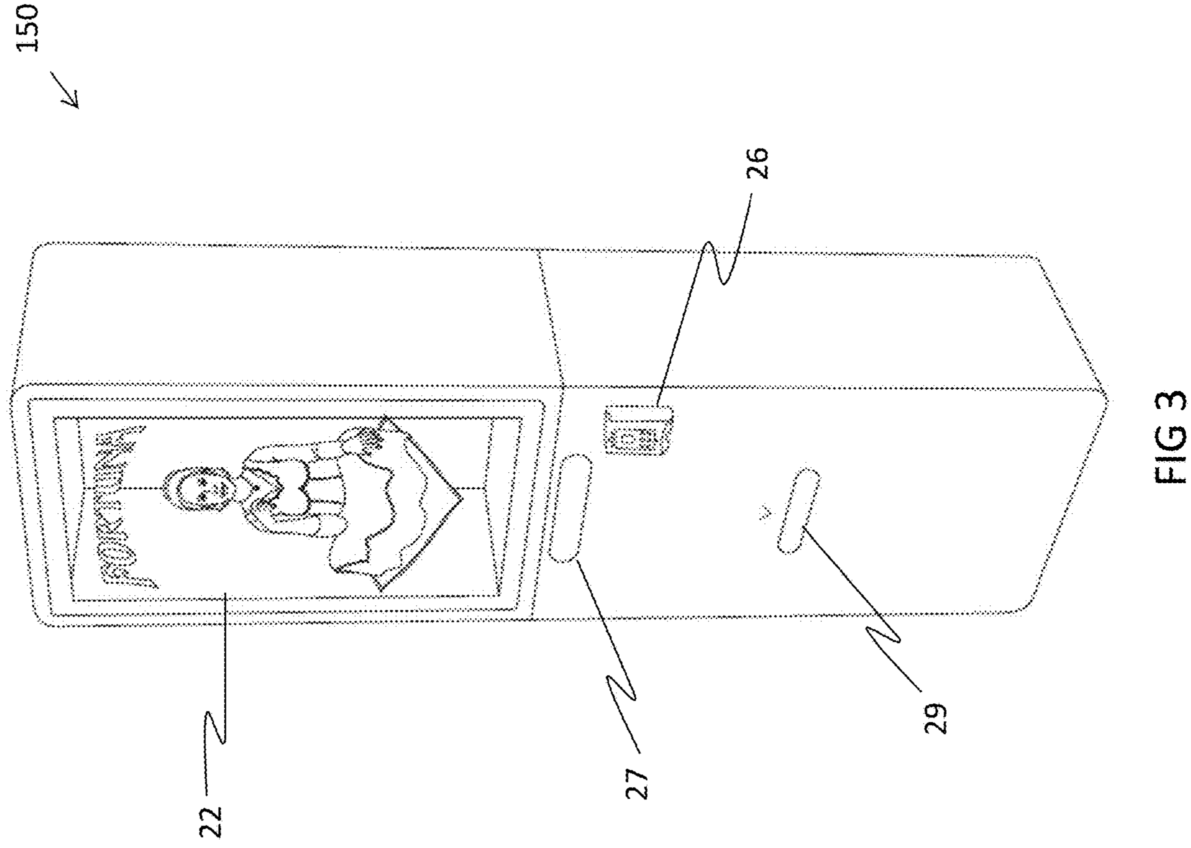
FIG. 3 is a kiosk, which is included in the interactive AI fortune-telling kiosk system, in accordance with embodiments of the current invention.

Reference is currently made to FIG. 3, which is a kiosk 150, which is included in interactive AI fortune-telling kiosk system 10, in accordance with embodiments of the current invention. As described previously in FIG. 1, and as may be seen in the current figure, kiosk 150 includes, inter alia, touch screen 22, payment interface 26, scanner 27, and print-ready access panel 29, which is a front-facing access slot configured to dispense printed outputs for user collection.

Figure 4:
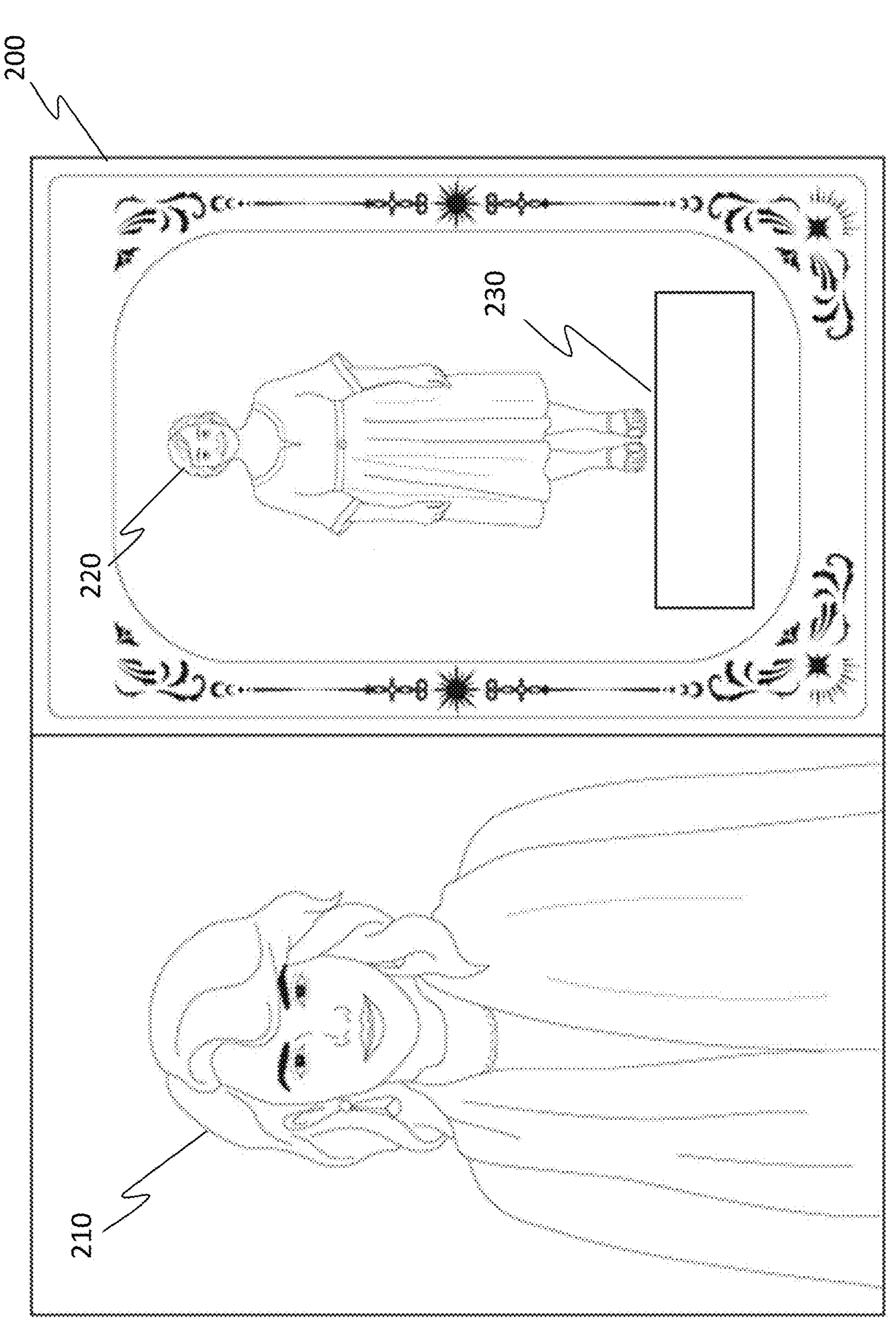
FIG. 4 is a first exemplary output artifact, in accordance with embodiments of the current invention.

Reference is currently made to FIG. 4, which is a first exemplary output artifact 200, in accordance with embodiments of the current invention. As described hereinabove in FIGS. 1 and 2, the system operates to photograph the user, and a fortune is generated. First exemplary output artifact 200 is equivalent to a printout/result delivery, including a current user photograph 210 (which is equivalent to the portrait image in step 108 of FIG. 2) and an AI-enhanced photo transformation 220 (representing the user in the future) with an overlaid fortune text 230.

Figure 5:
FIG. 5 is an exemplary avatar, in accordance with embodiments of the current invention.

Reference is currently made to FIG. 5, which is an exemplary avatar 225, in accordance with embodiments of the current invention. As described hereinabove, avatar 225 appears on the touch screen.

Figure 6:
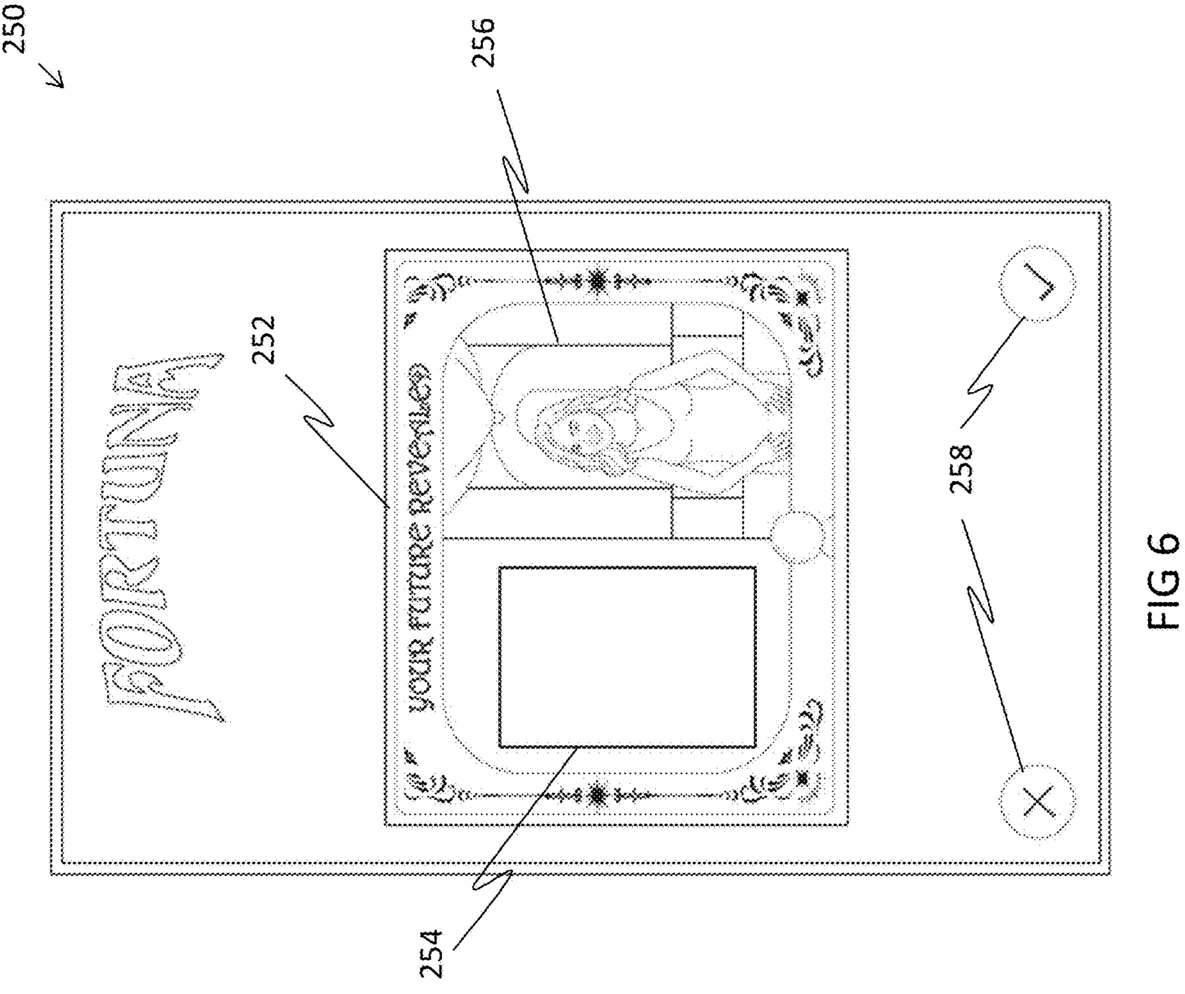
FIG. 6 is a second exemplary output artifact, in accordance with embodiments of the current invention.

Reference is currently made to FIG. 6, which is a second exemplary output artifact 250, in accordance with embodiments of the current invention. Second exemplary output artifact 250 appears on the touch screen and includes a "Your future revealed" message 252 including a textual message 254 and a current user photograph 256, similar to current user photograph 210 of FIG. 4. Two touch screen buttons 258 appear near the bottom of the touch screen, with "X" enabling the user to erase the currently-displayed second exemplary output artifact 250 and "check mark" enabling the user to proceed to an output as described hereinbelow in FIG. 7.

Figure 7:
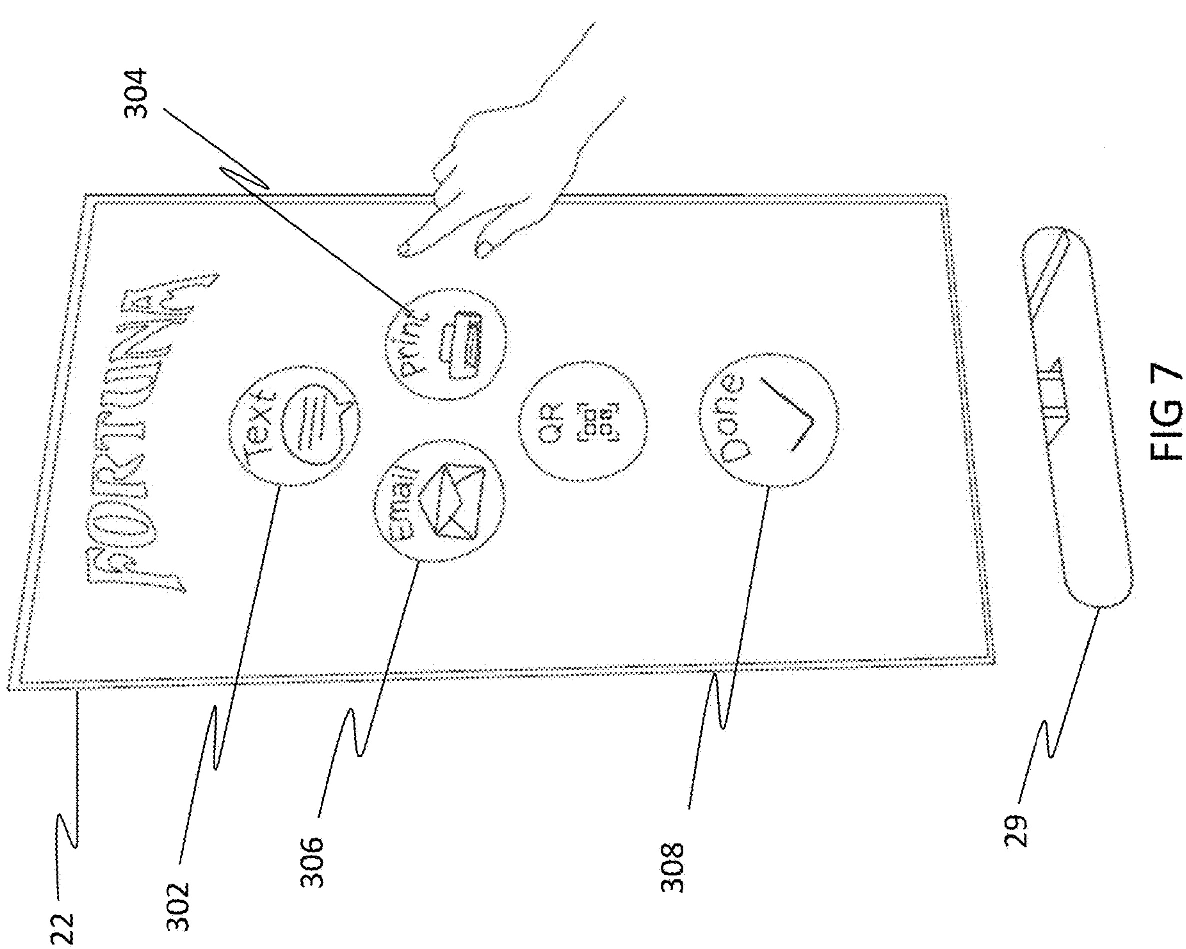
FIG. 7 is an exemplary output control, in accordance with embodiments of the current invention.

Reference is currently made to FIG. 7, which is an exemplary output control 300 and noted hereinabove in FIG. 3, in accordance with embodiments of the current invention. Output control 300, shown on touch screen 22 (ref FIG. 3), includes output options, indicated by graphic circles on the touch screen including: text 302; print 304; email 306; and done 308. The user, by touching the appropriate output option may output second exemplary output artifact 250 (shown in FIG. 6) all as described hereinabove in FIG. 2. Print-ready access panel 29 (ref FIG. 3) is shown in the current figure beneath the touch screen, for purposes of clarity/consistency.

Other screen-displayed outputs of interactive AI fortune-telling kiosk system 10 may be similarly generated/outputted using a screen display similar to exemplary output control 300, mutatis mutandis.

It will be appreciated that the above descriptions are intended only to serve as examples, and that many other embodiments are possible within the scope of the present invention and as defined in the appended claims.

The invention claimed is:

1. An interactive AI fortune-telling kiosk system configured to interact with a user, the kiosk system comprising:

an input subsystem housed within a kiosk type structure, the input subsystem having hardware components, including: a touch screen; a camera configured to capture user portraits for AI-based transformations; a proximity sensor; a scanner being an optical and an IR-based device for palm imaging; and a payment interface;

a processing subsystem housed within the kiosk-type structure including: a main processor; a secondary processor; and a kiosk software;

an output subsystem boused within the kiosk-type structure including: a display controller; a display configured to display an animated fortune teller avatar; a user output device; and a speaker/audio device;

wherein the processing subsystem is configured to receive inputs from the input subsystem, to control a session flow; and to manage hardware components; and wherein the kiosk software is configured to provide palmistry interpretation to extract palm landmarks, feed features into language models, and to generate narrative outputs; portrait transformations to apply AI models for aging, wealth, and stylistic modifications; and to session orchestration to manage inputs, avatar responses, timing, and outputs.

2. The interactive AI fortune-telling kiosk system according to claim 1, wherein a cloud/network is configured to communicate with the processing subsystem, the cloud/network including a network interface configured to provide connectivity for cloud-based AI services, updates, and remote monitoring, and a cloud/services module configured to host Large Language Models (LLMs), AI image models, content libraries, and analytics.

3. The interactive AI fortune-telling kiosk system according to claim 2, wherein the network interface is further configured to support Wi-Fi, ethernet, and cellular communication.

4. The interactive AI fortune-telling kiosk system according to claim 3, wherein the cloud/network is configured wholly remotely to the interactive AI fortune-telling kiosk system.

5. The interactive AI fortune-telling kiosk system according to claim 3, wherein the cloud/network is configured partially remotely to the interactive AI fortune-telling kiosk system.

6. The interactive AI fortune-telling kiosk system according to claim 5, wherein the cloud/network is configured to ensure scalability, to enable real-time and batch processing, and to provide data used by an output.

7. The interactive AI fortune-telling kiosk system according to claim 6, wherein the touch screen of the input subsystem is configured to serve as a main user interface with the kiosk system; wherein the camera is configured to capture user portraits for AI-based image transformations; and wherein the scanner is configured to scan a hand of the user being placed thereupon for palmistry analysis.

8. The interactive AI fortune-telling kiosk system according to claim 7, wherein the display of the output subsystem is configured to display an animated fortune teller avatar and user outputs; and wherein the speaker/audio device is configured to convey speech and music to the user.

9. A method of operating an interactive AI fortune-telling kiosk system, the system including:

an input subsystem housed within a kiosk-type structure, the input system having hardware components including: a touch screen; a camera; a proximity sensor; a scanner being an optical and an IR-based device for palm imaging; and a payment interface;

a processing subsystem housed within a kiosk-type structure including: a main processor; a secondary processor; and a kiosk software;

an output subsystem housed within a kiosk-type structure including: a display controller; a display to display an animated fortune teller avatar; a user output device; and a speaker/audio device;

whereby the interactive AI fortune-telling kiosk system is operated in a session with a user to receive an interactive AI fortune-telling experience, the method comprising:

validation of payment by the payment interface, which gates the AI fortune-telling kiosk system between pay-per-use and free play without payment in event and in rental use;

displaying the animated fortune teller avatar on the display, whereby the avatar greets the user with audio/visual animation;

using the camera to capture a portrait image of the user for subsequent AI-driven image transformations, the AI-driven image transformations including aging effects; lifestyle transformations; and an overlay with palmistry results;

activating the scanner, following detection of the user placing his hand in a correct position in the scanner, to capture at least one palm image of a hand scan;

completing the hand scan, whereby the animated fortune teller avatar acknowledges scan completion to the user, and the at least one palm image is stored for further analysis;

applying artificial intelligence models to the at least one palm image and to the portrait image to respectively perform palmistry analysis and photo processing;

displaying the animated fortune teller avatar with a personalized response, the animated fortune teller avatar greeting the user and delivering a personal message; and generating at least one composite output artifact which is displayed to the user before saving, printing, and deleting.

10. The method of operating the interactive AI fortune-telling kiosk system according to claim 9, whereby displaying the animated fortune teller avatar includes animations and text on the display and conveying speech output via the speaker/audio device.

11. The method of operating the interactive AI fortune-telling kiosk system according to claim 10, whereby completing the hand scan includes the animated fortune teller avatar instructing the user to remove his hand.

12. The method of operating the interactive AI fortune-telling kiosk system according to claim 11, whereby palmistry analysis includes extraction of hand features and feeding structured prompts into a language model to generate a fortune narrative.

13. The method of operating the interactive AI fortune-telling kiosk system according to claim 12, whereby the at least one composite output artifact includes the portrait image and an AI-enhanced photo transformation, the AI-enhanced photo transformation representing the user in the future, with an overlaid fortune text.

14. The method of operating the interactive AI fortune-telling kiosk system according to claim 13, whereby generating at least one composite output artifact further includes showing an output control on the display, the output control serving to allow output of the at least one composite output artifact including: a printout; a digital delivery including email, SMS, and QR code; and an online gallery.

* * * * *